(12) United States Patent
Lee et al.

(10) Patent No.: US 7,978,077 B2
(45) Date of Patent: Jul. 12, 2011

(54) RFID READER AND RFID TAG USING UHF BAND AND ACTION METHODS THEREOF

(75) Inventors: Dong-hyun Lee, Seongnam-si (KR); Ja-nam Ku, Yongin-si (KR); Young-hoon Min, Anyang-si (KR); Il-jong Song, Suwon-si (KR); Sung-oh Kim, Yongin-si (KR); Kyeong-soon Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1226 days.

(21) Appl. No.: 11/359,612

(22) Filed: Feb. 23, 2006

(65) Prior Publication Data

US 2006/0197651 A1 Sep. 7, 2006

(30) Foreign Application Priority Data

Mar. 2, 2005 (KR) ........................ 10-2005-0017117

(51) Int. Cl.
G08B 13/14 (2006.01)
(52) U.S. Cl. .................... 340/572.4; 340/572.1; 340/5.8
(58) Field of Classification Search ............... 340/572.1, 340/572.4, 572.8, 573.1, 539.11, 505, 506, 340/5.61, 5.74, 5.8, 10.1, 10.3; 705/67, 50; 235/380, 375
See application file for complete search history.

(56) References Cited

U.S. PATENT DOCUMENTS

| | | | |
|---|---|---|---|
| 6,842,106 B2* | 1/2005 | Hughes et al. | 340/5.8 |
| 7,031,946 B1* | 4/2006 | Tamai et al. | 705/67 |
| 7,173,528 B1* | 2/2007 | Stewart et al. | 340/572.3 |
| 7,228,182 B2* | 6/2007 | Healy et al. | 607/60 |
| 7,245,213 B1* | 7/2007 | Esterberg et al. | 340/539.12 |
| 7,258,266 B1* | 8/2007 | Bowe et al. | 235/375 |
| 7,325,132 B2* | 1/2008 | Takayama et al. | 713/168 |
| 7,474,211 B2* | 1/2009 | Kramer | 340/572.1 |
| 2006/0117066 A1* | 6/2006 | Smith et al. | 707/104.1 |
| 2006/0219776 A1* | 10/2006 | Finn | 235/380 |
| 2007/0194945 A1* | 8/2007 | Atkinson | 340/825.72 |

FOREIGN PATENT DOCUMENTS

KR 10-2006-0013097 A 2/2006
* cited by examiner

Primary Examiner — Van T. Trieu
(74) Attorney, Agent, or Firm — Sughrue Mion, PLLC

(57) ABSTRACT

A radio frequency identification reader and a radio frequency identification tag that use an ultrahigh frequency band, and action methods of the radio frequency identification reader and the radio frequency identification tag. The radio frequency identification reader includes: a data generator generating data to be transmitted to a radio frequency identification tag; if a command to control the radio frequency identification tag has to be authenticated, a reader controller controlling the data generator to generate the data including an authentication code; and a reader transmitter transmitting the data to the radio frequency identification tag. As a result, securing of communications of a specific command between the radio frequency identification reader and the radio frequency identification tag can be reinforced.

20 Claims, 3 Drawing Sheets

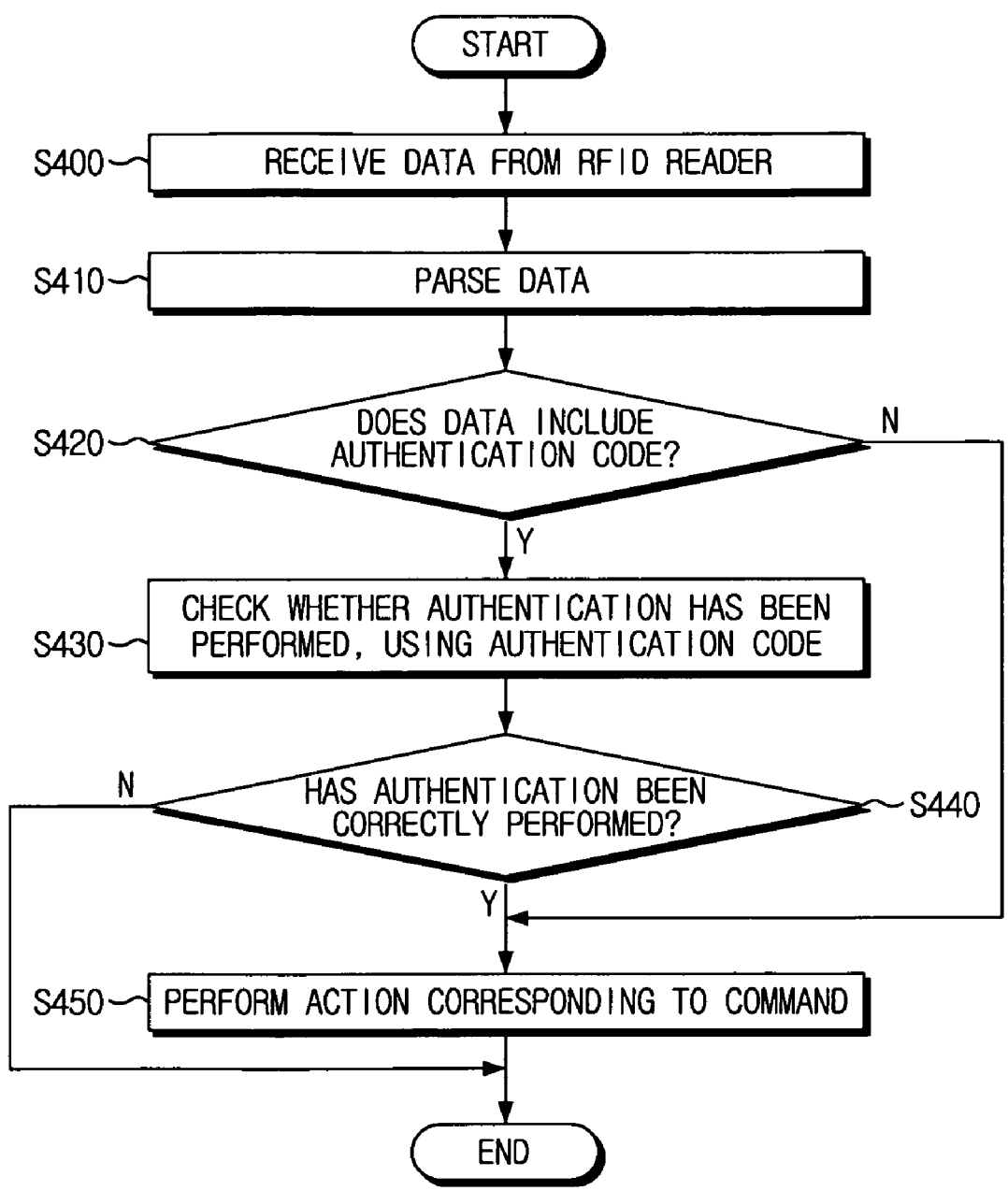

RFID READER AND RFID TAG USING UHF BAND AND ACTION METHODS THEREOF

CROSS-REFERENCE TO RELATED APPLICATIONS

This application claims priority from Korean Patent Application No. 10-2005-0017117 filed Mar. 2, 2005, in the Korean Intellectual Property Office, the disclosure of which is incorporated herein by reference.

BACKGROUND OF THE INVENTION

1. Technical Field

The present invention relates to a radio frequency identification (RFID) reader and an RFID tag using an ultrahigh frequency (UHF) band and action methods of the RFID reader and the RFID tag, and more particularly, to an RFID reader and an RFID tag using a UHF band and mutually authenticating a specific command disturbing an action of the RFID tag and action methods of the RFID reader and the RFID tag.

2. Related Art

RFID is a kind of automatic identification and data capture (AIDC), reading data stored in a tag including microchips using radio frequency (RF) in a non-contact way.

In the related art, RFID can be classified by standards including power supply, frequency band, communication connection, and the like. For example, RFID can be classified into active and passive types based on the supply of the power, or can be classified into high and low frequencies based on the frequency band.

According to the classification by the frequency band, a low frequency tag using a frequency band between 30 KHz and 500 KHz is applied to security, management of assets, identification of choice goods, and the like. A high frequency tag using a frequency band between 860 MHz and 960 MHz or of 2.45 GHz has been considered to be applied to railways, commercial vehicle, distribution, and the like due to a readable distance of 30 m or more.

There are currently five frequency bands that have been variously applied according to their frequency characteristics. A frequency band between 125 KHz and 135 KHz (ISO 18000-2) is used for distribution, entrance cards, or the like, a frequency band of 13.56 MHz (ISO 18000-3) is used for credit cards, transportation cards, or the like, and a frequency band of 433.92 MHz (ISO 18000-7) or more can be used in active tags, generally applied to containers or the like. Also, the frequency band between 860 MHz and 960 MHz has been examined to be positively applied to physical distribution and to be globalized as global technology audit guides (GTAG) or the like, and a frequency band of 2.45 GHz (ISO 18000-4) is suitable to prevent electronic documents such as i-chips or passports from being counterfeited.

RFID-related international standards are enacted by the International Standards Organization (ISO) and International Engineering Consortium (IEC). Electronic Product Code (EPC) global has enacted de facto standards of RFID using a UHF band independently of ISO.

EPC standards of a UHF band are generate 2 of class 1 for passive tags, and aim at supply chain management (SCM) for physical distribution and distribution replacing bar codes.

In such an RFID system, an RFID reader and an RFID tag transmit and/or receive data packets with respect to each other. In particular, data packets between an RFID reader and an RFID tag of EPC Class 1 of a UHF band include only parity values of fields that may be broken during their transmission.

Another RFID reader may enter into an electric wave range during communications to falsify and counterfeit a command. Thus, the clarity of data of the RFID reader and the RFID tag may not be secured during communications. As a result, physical distribution and distribution fields may be fatally damaged.

Also, the RFID tag is designed to respond to all kinds of RFID readers. Thus, an 8-bit password can be detected with 256 combinations. As a result, a value of the RFID tag and an ID code may be counterfeited.

SUMMARY OF THE INVENTION

The present invention provides an RFID reader and an RFID tag using a UHF band, the RFID reader inserting an authentication code during a transmission of a specific command and the RFID tag performing only a correctly authenticated command, so as not to perform an unauthenticated command and action methods of the RFID reader and the RFID tag.

According to an aspect of the present invention, there is provided a radio frequency identification reader using an ultrahigh frequency band, including: a data generator generating data to be transmitted to a radio frequency identification tag; if a command to control the radio frequency identification tag has to be authenticated, a reader controller controlling the data generator to generate the data including an authentication code; and a reader transmitter transmitting the data to the radio frequency identification tag.

The authentication code may be a Keyed-Hash Message Authentication Code.

The radio frequency identification reader of claim 1, wherein the command that has to be authenticated is "Kill" or "ProgramID."

The radio frequency identification reader may further include: a reader receiver receiving response data from the radio frequency identification tag.

According to another aspect of the present invention, there is provided an action method of a radio frequency identification reader using an ultrahigh frequency band, including: determining whether a command to control a radio frequency identification tag has to be authenticated; if it is determined that the command has to be authenticated, generating data comprising an authentication code; and transmitting the data to the radio frequency identification tag.

The authentication code may be a Keyed-Hash Message Authentication Code.

The command that has to be authenticated may be "Kill" or "ProgramID."

According to still another aspect of the present invention, there is provided a radio frequency identification tag using an ultrahigh frequency band, including: a tag receiver receiving data from a radio frequency identification reader; an authenticator checking whether an authentication has been performed, using an authentication code of the data; and if the data includes the authentication code, a tag controller controlling the authenticator to check whether the authentication has been performed, and if the authenticator has correctly performed the authentication, performing an action corresponding to the command.

The authentication code may be a Keyed-Hash Message Authentication Code.

The tag controller may include: a data parser parsing the received data, and a response generator performing the action and then generating response data to be transmitted to the radio frequency identification reader. The radio frequency identification tag may further include: a tag transmitter transmitting the response data to the radio frequency identification reader.

According to yet another aspect of the present invention, there is provided an action method of a radio frequency identification tag using an ultrahigh frequency band, including: parsing data transmitted from a radio frequency identification reader; if the data includes an authentication code, checking using the authentication code whether an authentication has been performed; and if the authentication has been correctly performed, performing an action corresponding to a command of the data.

The authentication code may be a Keyed-Hash Message Authentication Code.

After performing the action corresponding to the command, the action method may further include: generating response data to be transmitted to the radio frequency identification reader and transmitting the response data to the radio frequency identification reader.

BRIEF DESCRIPTION OF THE DRAWINGS

The above and/or other aspects of the present invention will be more apparent by describing exemplary embodiments with reference to the accompanying drawings, in which:

FIG. 5 is a flowchart of an action method of an RFID tag according to an exemplary embodiment of the present invention.

DETAILED DESCRIPTION OF THE EXEMPLARY EMBODIMENTS

Figure 1:
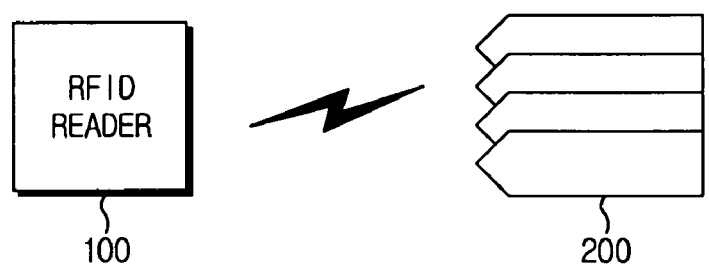
FIG. 1 is a view illustrating a configuration of an RFID system according to an exemplary embodiment of the present invention.

Exemplary embodiments of the present invention will be described in greater detail with reference to the accompanying drawings.

In the following description, same drawing reference numerals are used for the same elements, even in different drawings. The matters defined in the description such as a detailed construction and elements are provided to assist in a comprehensive understanding of the invention. Thus, it is apparent that the exemplary embodiment(s) of the present invention can be carried out without those defined matters. Also, well-known functions or constructions are not described in detail since they would obscure the invention in unnecessary detail, and would be well-known by those of ordinary skill in the art.

FIG. 1 is a view illustrating a configuration of an RFID system according to an exemplary embodiment of the present invention. The RFID system includes an RFID reader 100 and an RFID tag 200. The RFID reader 100 and the RFID tag 200 of the RFID system use a UHF band of about 900 MHz, which is mainly applied in physical distribution and distribution fields.

In general, the RFID reader 100 continuously radiates electric waves using an antenna (not shown). The electric waves radiated from the RFID reader 100 are transmitted to at least one RFID tag 200 existing within a radiation range of the RFID reader.

The RFID reader 100 generates data, including a command to control the RFID tag 200, and transmits the data to the RFID tag 200. The RFID reader 100 will be described in more detail with reference to FIG. 2.

The RFID tags 200 may be generally installed in objects having various shapes, and thus a position of the RFID tag 200 may be changed at any time. If the RFID tag 200 is positioned within a range of the electric waves radiated by the RFID reader 100, the RFID tag 200 receives the electric waves from the RFID reader 100.

The RFID tag 200 receives and parses the data transmitted from the RFID reader 100 and performs an action corresponding to the command included in the data. The RFID tag 200 will be described in more detail with reference to FIG. 3.

Figure 2:
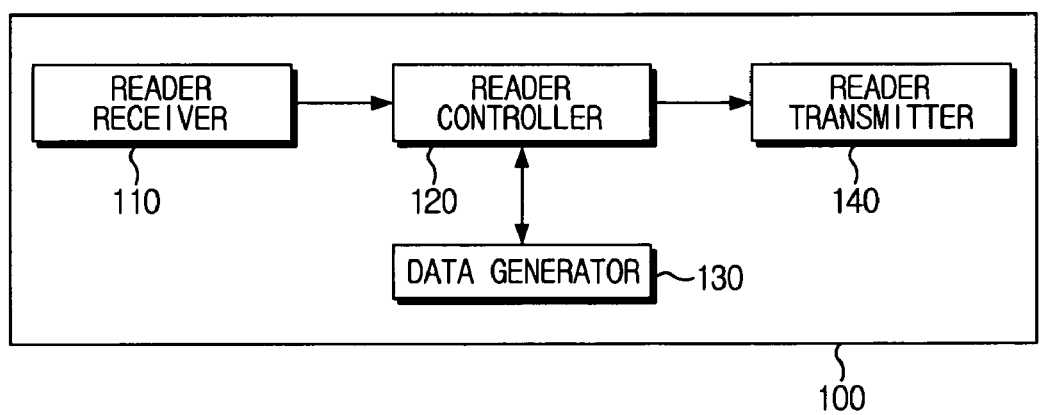
FIG. 2 is a block diagram of an RFID reader according to an exemplary embodiment of the present invention.

FIG. 2 is a block diagram of an RFID reader according to an exemplary embodiment. An RFID reader 100 according to the exemplary embodiment includes a reader receiver 110, a reader controller 120, a data generator 130, and a reader transmitter 140.

The reader receiver 110 receives data from the RFID tag 200. In the exemplary embodiment, the reader receiver 110 may receive response data from the RFID tag 200.

The reader controller 120 controls the overall action of the RFID reader 100. If a command to control the RFID tag 200 needs to be authenticated, the reader controller 120 controls the data generator 130 that will be described later to generate data including an authentication code.

Here, commands to control the RFID tag 200 that must be authenticated include "Kill" and "ProgramID", which may have a negative effect on the action of the RFID tag 200. However, the foregoing commands are merely exemplary in nature, and other commands in the field of RFID communication as would be understood by one of ordinary skill in the art may also be used. For example, but not by way of limitation, commands such as read (VerifyID) and delete (EraseID) may also be used, but the exemplary embodiment is not limited thereto.

The data generator 130 generates the data to be transmitted from the RFID reader 100 to the RFID tag 200. According to the exemplary embodiment, if the reader controller 120 determines that the command included in the data to be transmitted needs to be authenticated, the data generator 130 generates the data including the authentication code.

The data generator 130 adopts a Keyed-Hash Message Authentication Code (HMAC) as the authentication code to be included in the data. The HMAC is used to authenticate a perfection and a source of a message, and includes a cryptographic hash function and a symmetric key.

In other words, if the data generator 130 generates data including a command such as "Kill" or "ProgramID" that may have a negative effect on the action of the RFID tag 200, the data generator 130 adopts an HMAC algorithm to generate data including the HMAC. However, since commands except "Kill" and "ProgramID" do not need to be authenticated, the data generator 130 generates data without the HMAC algorithm.

Data fields generated by the data generator 130 will be illustrated below.
[PREAMBL] [CLKSYNC] [SOF] [CMD] [P1]
[PTR][P2]
[LEN][P3]
[VALUE][P4]
[P5]
[EOF]

With reference to the data fields, if the field "[CMD]" includes a command that is "Kill" or "ProgramID," the data generator 130 uses the HMAC algorithm to insert an authentication code, i.e., the HMAC, into the field "[VALUE]".

The reader transmitter 140 transmits the data generated by the data generator 130 to the RFID tag 200.

Figure 3:
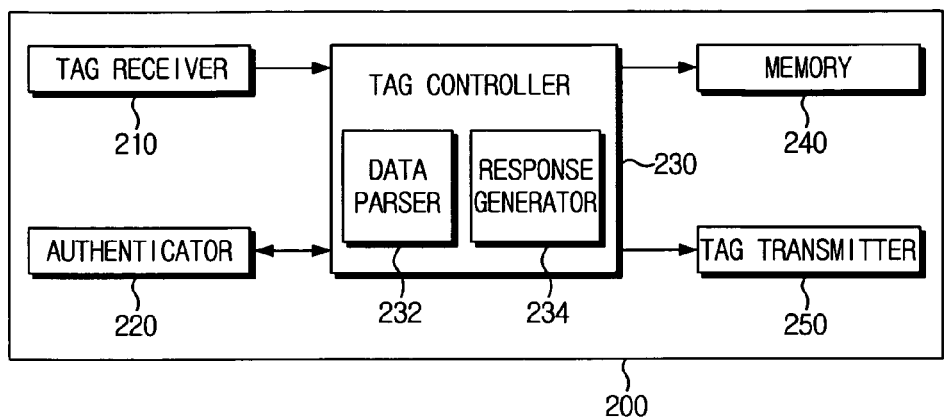
FIG. 3 is a block diagram of an RFID tag according to an exemplary embodiment of the present invention.

FIG. 3 is a block diagram of an RFID tag according to an exemplary embodiment. The RFID tag 200 includes a tag receiver 210, an authenticator 220, a tag controller 230, a memory 240, and a tag transmitter 250.

The tag receiver 210 receives data from the RFID reader 100 and provides the data to the tag controller 230, as described in greater detail below.

The authenticator 220 checks whether an authentication has been performed, using an authentication code included in the data received through the tag receiver 210 under the control of the tag controller 230 as described in greater detail below. Since the RFID reader 100 adopts the HAMC algorithm to transmit the data including the authentication code, the authenticator 220 may also use the HAMC algorithm to check whether the authentication has been performed, using the authentication code.

If the data received through the tag receiver 210 includes the authentication code, the tag controller 230 controls the authenticator 220 to check whether the authentication has been performed. If the authenticator 220 has correctly performed the authentication, the tag controller 230 performs an action corresponding to the command included in the data.

To perform such a function, the tag controller 230 includes a data parser 232 and a response generator 234. The data parser 232 parses the data received through the tag receiver 210 to extract the authentication code and the command from the data. The tag controller 230 may provide the authentication code to the authenticator 220 and perform the action corresponding to the command through the data parsed by the data parser 232.

The response generator 234 generates response data that the tag controller 230 desires to transmit to the RFID tag 200. For example but not by way of limitation, the response data may be a result of transmitting data transmitted from the RFID reader 100, and a result of processing the data transmitted from the RFID reader 100.

The memory 240 may store data on a password, and a state value of the RiFID tag 200 and provide the data to the tag controller 230 if necessary.

The tag transmitter 250 transmits data to be transmitted from the RFID tag 200 to the RFID reader 100. The tag transmitter 250 according to the exemplary embodiment transmits the response data generated by the response generator 234 to the RFID reader 100.

Figure 4:
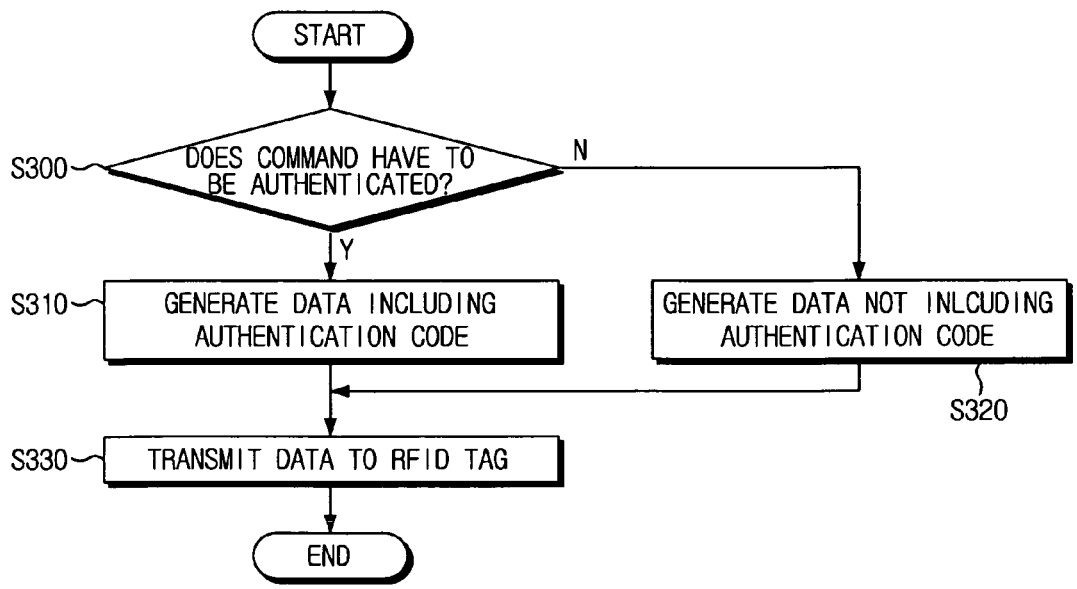
FIG. 4 is a flowchart of an action method of an RFID reader according to an exemplary embodiment of the present invention.

FIG. 4 is a flowchart of an action method of an RFID reader according to an exemplary embodiment. The action method of the RFID reader 100 is described with reference to FIGS. 1 through 4.

In operation S300, the reader controller 120 of the RFID reader 100 determines whether a command to control the RFID tag 200 needs to be authenticated. In other words, the reader controller 120 determines whether a command to be transmitted to the RFID tag 200 is "Kill" or "ProgramID."

If the reader controller 120 determines in operation S300 that the command to be transmitted to the RFID tag 200 needs to be authenticated, the reader controller 120 controls the data generator 130 to generate data, including (but not limited to) an authentication code. In operation S310, the data generator 130 generates the data including an HMAC and the corresponding command using an HMAC algorithm.

If the reader controller 120 determines in operation S300 that the command to be transmitted to the RFID tag 200 does not need to be authenticated, the reader controller 120 controls the data generator 130 to generate data, not including the authentication code. In operation S320, the data generator 130 generates the data that does not include the authentication code, but includes the corresponding command.

In operation S330, after the data generator 130 generates the data, the reader controller 120 controls the reader transmitter 140 to transmit the data. The reader transmitter 140 transmits the data generated by the data generator 130 to the RFID tag 200.

FIG. 5 is a flowchart of an action method of an RFID tag according to an exemplary embodiment. The action method of the RFID tag 200 is described with reference to FIGS. 1 through 4.

If the data transmitter 140 of the RFID reader 100 transmits the data to the RFID tag 200, the RFID tag 200 receives the data from the reader transmitter 140 through the tag receiver 210, in operation S400. The tag receiver 210 provides the data to the tag controller 230.

In operation S410, the tag controller 230 parses the data through the data parser 232. The data parser 232 extracts an authentication code and a command from the data.

In operation S420, the tag controller 230 determines whether the data parsed by the data parser 232 includes the authentication code.

In operation S430, if the tag controller 230 determines in operation S420 that the data includes the authentication code, the tag controller 230 controls the authenticator 220 to check whether an authentication has been performed using the authentication code. The authenticator 220 uses the authentication code to check that the authentication has been performed.

If the authenticator 220 correctly performs the authentication in operation S430, the tag controller 230 performs an action corresponding to a command included in the data received from the RFID reader 100 in operations S440 and S450. More specifically, if it is determined that the authentication has been correctly performed in operation S440, then the action corresponding to the command is performed in operation S450.

If the tag controller 230 determines in operation S420 that the data does not include the authentication code, the tag controller 230 determines that the command of the data does not have a negative effect on the RFID tag 200 to perform the action corresponding to the command in operation S450.

As described above, in an RFID reader and an RFID tag using a UHF band and action methods of the RFID reader and the RFID tag, the RFID reader can insert an authentication code during a transmission of a specific command. Also, the RFID tag can perform only a correctly authenticated command. Thus, the RFID tag cannot perform an unauthenticated command. As a result, the clarity of data can be secured during communications between the RFID tag and the RFID reader.

Moreover, the RFID tag can protect data from being counterfeited and falsified by another RFID reader during processing of a command transmitted from a specific RFID reader due to the characteristic of the RFID tag responding to all kinds of RFID readers.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A radio frequency identification reader configured to communicate in an ultrahigh frequency band, the radio frequency identification reader comprising:
a generator that generates data to be transmitted to a radio frequency identification tag;
a reader controller that controls the generator to generate the data if a command to control the radio frequency identification tag needs to be authenticated, the data comprising an authentication code; and
a reader transmitter that transmits the generated data to the radio frequency identification tag,
wherein the generator generates the data comprising the authentication code under the control of the reader controller.

2. The radio frequency identification reader of claim 1, wherein the authentication code comprises a Keyed-Hash Message Authentication Code.

3. The radio frequency identification reader of claim 1, wherein the command comprises one of "Kill" and "ProgramID."

4. The radio frequency identification reader of claim 1, wherein the command comprises one of "VerifyID" and "EraseID".

5. The radio frequency identification reader of claim 1, further comprising a reader receiver that receives a response from the radio frequency identification tag.

6. A method of communicating with a radio frequency identification reader using an ultrahigh frequency band, the method comprising:
determining whether a command to control a radio frequency identification tag needs to be authenticated;
if it is determined that the command has to be authenticated, generating data comprising an authentication code; and
transmitting the data to the radio frequency identification tag.

7. The method of claim 6, wherein the authentication code is a Keyed-Hash Message Authentication Code.

8. The method of claim 6, wherein the command comprises one of "Kill" and "ProgramID."

9. The method of claim 6, wherein the command comprises one of "VerifyID" and "EraseID".

10. A radio frequency identification tag configured to communicate in an ultrahigh frequency band, the radio frequency identification tag comprising:
a tag receiver that receives data from a radio frequency identification reader;
a tag controller that determines whether the data includes an authentication code; and
an authenticator that is controlled by the tag controller to check the authentication code of the data to determine whether an authentication has been performed,
wherein the tag controller performs an action corresponding to a command if the authentication code is correct if the authentication code is included in the data.

11. The radio frequency identification tag of claim 10, wherein the authentication code comprises a Keyed-Hash Message Authentication Code.

12. The radio frequency identification tag of claim 10, wherein the tag controller comprises:
a data parser that parses the received data.

13. The radio frequency identification tag of claim 12, wherein the data parser extracts the authentication code and the command from the data.

14. The radio frequency identification tag of claim 10, wherein the tag controller further comprises:
a response generator that performs the action and then generates response data transmittable to the radio frequency identification reader.

15. The radio frequency identification tag of claim 14, further comprising:
the tag transmitter that transmits the response data to the radio frequency identification reader.

16. The radio frequency identification tag of claim 10, wherein the received data includes the command and the authentication code, wherein the command controls the radio frequency identification and the command is authenticated.

17. A method of communicating with a radio frequency identification tag using an ultrahigh frequency band, method comprising:
receiving, by the radio frequency identification tag, data transmitted from a radio frequency identification reader;
parsing the data transmitted from a radio frequency identification reader;
if it is determined that the data includes an authentication code based on a result of the parsing, checking using the authentication code to determine an authentication has been performed; and
if it is determined that the authentication has been correctly performed, performing an action corresponding to a command of the data.

18. The method of claim 17, wherein the authentication code comprises a Keyed-Hash Message Authentication Code.

19. The method of claim 17, further comprising:
after the performing, generating response data to be transmitted to the radio frequency identification reader; and
transmitting the response data to the radio frequency identification reader.

20. The radio frequency identification tag of claim 17, wherein the received data includes the command and the authentication code, wherein the command controls the radio frequency identification and the command is authenticated.

* * * * *